United States Patent [19]
Miller et al.

[11] Patent Number: 5,984,400
[45] Date of Patent: Nov. 16, 1999

[54] SYSTEM FOR COVERING THE BED AND BOX OF A PICK-UP TRUCK, WAGON OR TRAILER

[75] Inventors: Robert D. Miller, Norman; Jeffrey M. Nett, Tuttle; Jamie A. Nett, Norman, all of Okla.; Larry J. Thomsen, Maple Lake, Minn.; Michael J. Sterling, Coon Rapids, Minn.; Randall S. Narlock, St. Francis, Minn.

[73] Assignee: Lund Industries, Inc., Anoka, Minn.

[21] Appl. No.: 08/958,936

[22] Filed: Oct. 28, 1997

[51] Int. Cl.⁶ ....................................................... B60P 7/02
[52] U.S. Cl. ................................ 296/100.15; 296/100.16; 296/100.18
[58] Field of Search ........................ 296/100.15, 100.16, 296/100.17, 100.18; 160/371

[56] References Cited

U.S. PATENT DOCUMENTS

| | | |
|---|---|---|
| D. 281,487 | 11/1985 | Chapman . |
| D. 323,479 | 1/1992 | Akashi et al. . |
| D. 324,195 | 2/1992 | Ueno . |
| D. 333,607 | 3/1993 | Isler . |
| D. 337,554 | 7/1993 | Lucas . |
| D. 350,107 | 8/1994 | Ramaciotti . |
| 3,936,077 | 2/1976 | Bliek . |
| 3,954,296 | 5/1976 | Patnode . |
| 4,061,394 | 12/1977 | Vodin . |
| 4,273,377 | 6/1981 | Alexander . |
| 4,285,539 | 8/1981 | Cole . |
| 4,377,307 | 3/1983 | Santarelli . |
| 4,484,777 | 11/1984 | Michel ................................ 296/100.15 |
| 4,573,730 | 3/1986 | Gondert et al. . |
| 4,600,233 | 7/1986 | Boydston . |
| 4,607,876 | 8/1986 | Red ..................................... 296/100.18 |
| 4,687,247 | 8/1987 | Muscat . |
| 4,730,866 | 3/1988 | Nett ..................................... 296/100.18 |
| 4,792,178 | 12/1988 | Kokx . |
| 4,799,729 | 1/1989 | Muscat . |
| 4,838,602 | 6/1989 | Nett ..................................... 296/100.18 |
| 4,861,092 | 8/1989 | Bogard . |
| 4,923,240 | 5/1990 | Swanson ............................. 296/100.18 |
| 5,067,768 | 11/1991 | Fischbach . |
| 5,139,375 | 8/1992 | Franchuk . |
| 5,152,574 | 10/1992 | Tucker . |
| 5,174,353 | 12/1992 | Schmeichel et al. . |
| 5,183,309 | 2/1993 | Jordan . |
| 5,203,055 | 4/1993 | Broadwater et al. ............... 296/100.15 |
| 5,207,262 | 5/1993 | Rushford ............................ 296/100.16 |
| 5,228,736 | 7/1993 | Dutton . |
| 5,261,719 | 11/1993 | Tucker ................................ 296/100.18 |
| 5,275,458 | 1/1994 | Barben et al. . |
| 5,301,995 | 4/1994 | Isler . |
| 5,328,310 | 7/1994 | Lockney . |
| 5,335,960 | 8/1994 | Benignu . |
| 5,385,377 | 1/1995 | Girard ................................ 296/100.16 |
| 5,398,985 | 3/1995 | Robinson . |
| 5,472,256 | 12/1995 | Tucker . |
| 5,487,585 | 1/1996 | Wheatley ........................... 296/100.18 |
| 5,511,843 | 4/1996 | Isler et al. .......................... 296/100.17 |
| 5,522,635 | 6/1996 | Downey ............................. 296/100.16 |
| 5,540,475 | 7/1996 | Kersting et al. ................... 296/100.16 |
| 5,553,652 | 9/1996 | Rushford ............................ 296/100.18 |
| 5,655,808 | 8/1997 | Wheatley ........................... 296/100.17 |
| 6,788,315 | 8/1998 | Tucker ................................ 296/100.16 |

*Primary Examiner*—Joseph D. Pape
*Assistant Examiner*—Kiran Patel
*Attorney, Agent, or Firm*—Nikolai, Mersereau & Dietz, P.A.

[57] ABSTRACT

A system for covering the box and bed of a pick-up truck includes a tarp, a pair of side rails, an end rail and a cam latch associated with each side rail. The tarp includes beads associated with its edges. These beads cooperate with slots in the rails to fix the edges of the tarp to the rails. The cam latches are provided to interact with the end rail to stretch the tarp and help secure it in place over the bed and box of the pick-up truck.

16 Claims, 6 Drawing Sheets

SYSTEM FOR COVERING THE BED AND BOX OF A PICK-UP TRUCK, WAGON OR TRAILER

BACKGROUND OF THE INVENTION

1. Field of the Invention

The present invention relates to a system for covering an opening in a detachable manner. More specifically, the present invention relates to a system for detachably covering the bed and box of a pick-up truck or trailer.

2. Description of the Prior Art

Since before the advent of the motorized truck, people have understood the need to cover items as the items are transported to protect them from the elements. Generally, when such items are being transported on the bed of a wagon, trailer or truck, this has been accomplished using a tarp. To provide adequate protection, the tarp should be fixed in place along the entire perimeter of the box. The tarp should also be taut and remain so to prevent it from sagging and collecting water or debris. Thus, some reliable means of holding the tarp in place is required to provide effective protection. In the days of the pioneers who explored this continent, ropes were used to hold tarps in place. A variety of fasteners for holding tarps in place have been developed since that time. Fasteners in common use today include bungie cords, hook-and-loop type fasteners, grommets and rope arrangements, various types of snaps, and various types of clips.

One cover arrangement which incorporates a number of different fasteners for securing a tarp in place is disclosed in U.S. Pat. No. 5,174,353 dated Dec. 29, 1992 to Schmeichel et al. The cover arrangement disclosed in this patent, for example, includes a tarp and hook-and-loop type fasteners to attach to the sides of the tarp and the sides of a truck box. This patent also discloses an L-shaped plate which cooperates with various cord members, stops, lips and locks to secure the back end of the tarp in place. This patent also recognizes the difficulty associated with using hook-and-loop type fasteners. Rather than using a different type of fastener, the patent suggests the use of plastic members attached to the tarp to prevent the two elements of the hook-and-loop type fastener from engaging each other as the tarp is rolled and unrolled.

Despite the many attempts made in the prior art to provide a simple, inexpensive and durable cover that can be easily and quickly opened and closed, the need for such a cover continues to exist. The present invention fills this need and solves the problems associated with prior art covers outlined above.

SUMMARY OF THE INVENTION

The present invention relates to a system for covering the box and bed of a truck, wagon or trailer. The system includes a frame. The frame includes a pair of side rails. Each side rail is fixed to the top edge of one of the sides of the box. The side rails have a front end, a rear end, and an outer channel that runs the length of the rail. Fixed to the rear end of each rail is a cam latch. The frame also includes a front rail and a back rail. The front rail is attached to the top edge of the front of the box.

The system also includes a tarp. The tarp has a front edge, a back edge, and a pair of side edges. A bead projects downwardly along the length of each side edge of the tarp. The front edge of the tarp is attached to the front rail of the frame. The back edge of the tarp is attached to the back rail of the frame. This arrangement fixes the front of the tarp to the front of the box. It also allows the back rail to be used as a spindle about which the remainder of the tarp can be rolled and unrolled.

The tarp is easily secured in the covered position. The tarp is unrolled. The ends of the back rail are then placed in contact with the two cam latches. The levers of the cam latches are rotated to engage the ends of the back rail to tighten the tarp and lock it in place. To create a water-tight seal along the edges, the beads on the tarp are pushed into the outer channels of the side rails.

The principle object of the present invention is to provide a truck bed and box cover which is easily opened and closed.

Another object of the present invention is to provide such a cover that can be secured in place and left partially open or partially opened to gain access to the interior of the box.

Another object of the invention is to provide such a cover which is durable and stretched tight when closed.

Still another object of the invention is to provide a cam lock that serves to stretch the cover tight.

A further object of the invention is to provide a quick means for securing the sides of the cover to the rails to create a seal along the sides of the cover.

These and other advantages of the present invention will become more clear from a reading of the detailed description of the invention in conjunction with the drawings.

DETAILED DESCRIPTION OF THE PREFERRED EMBODIMENTS

Figure 1:
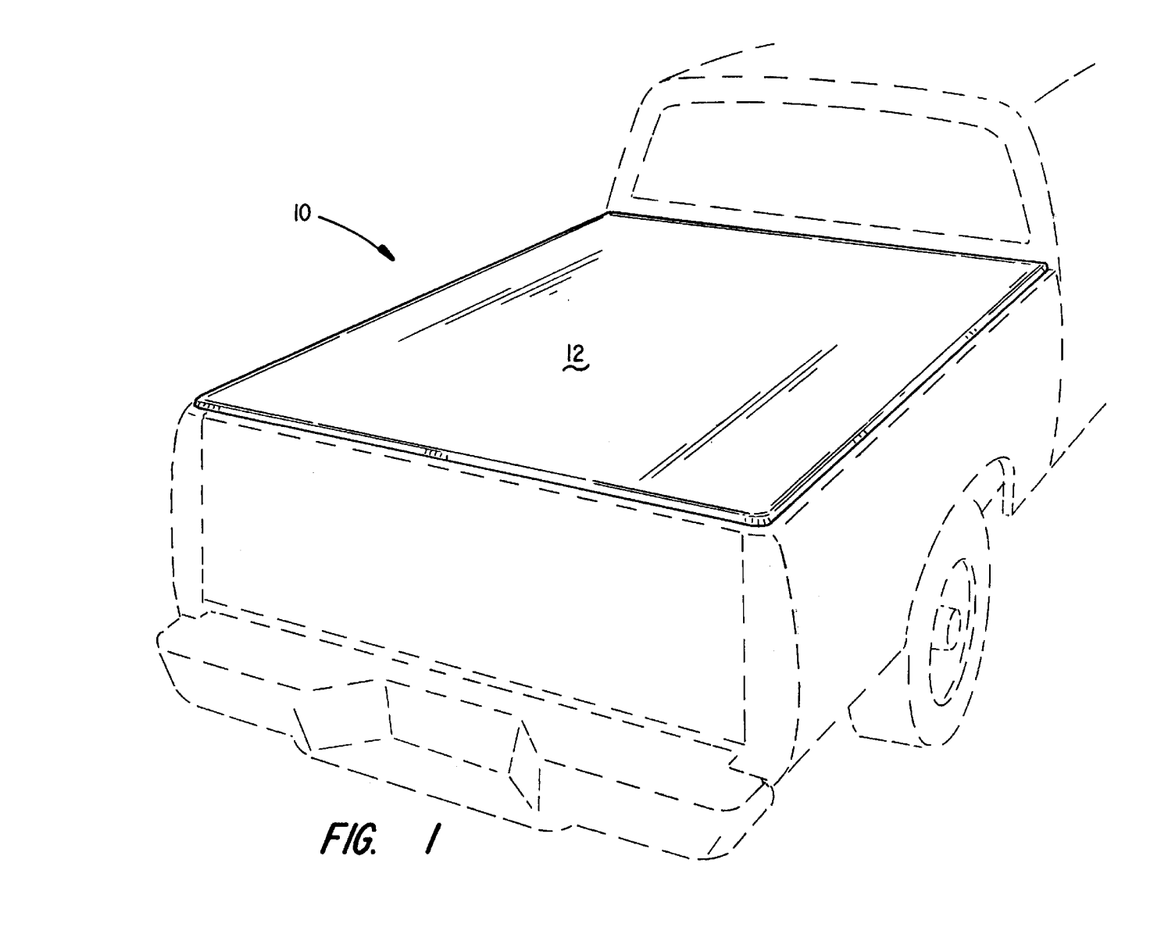
FIG. 1 is a perspective view of a truck box with the cover of the present invention in place.
Figure 2:
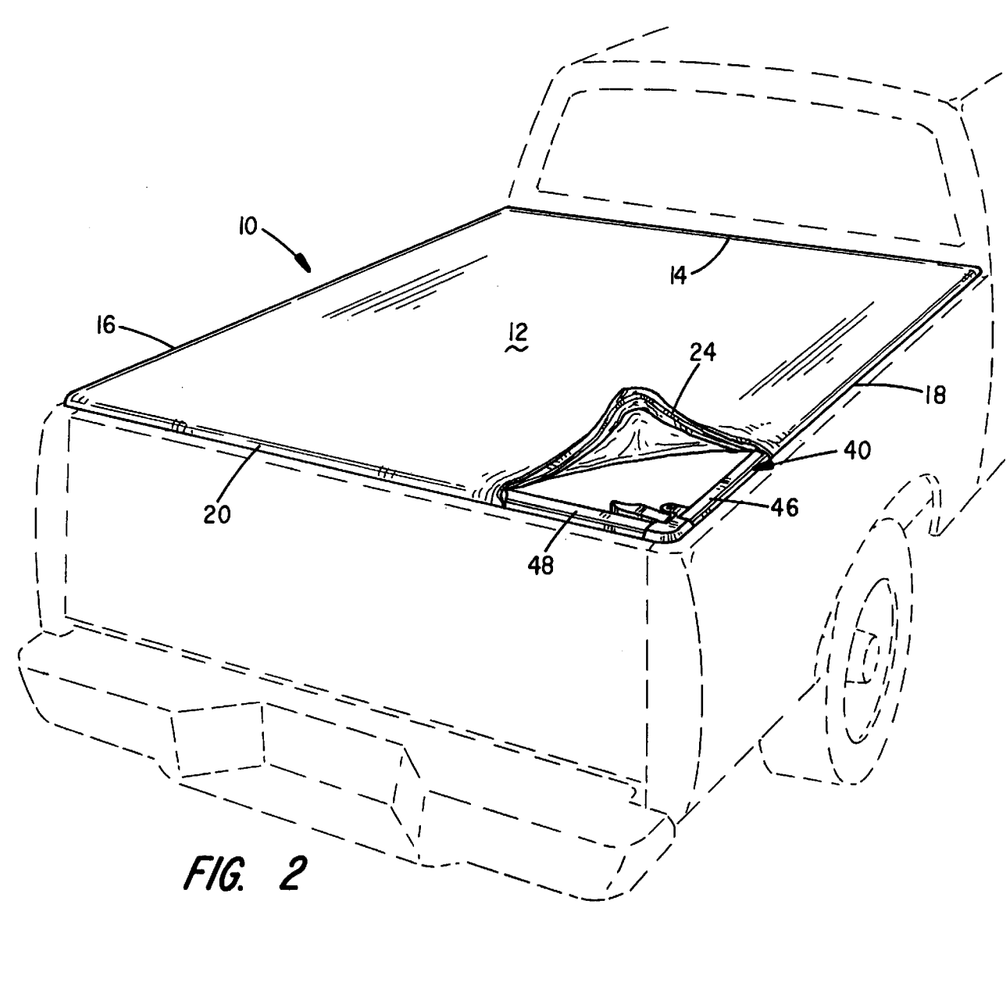
FIG. 2 is a perspective view of a truck box with the cover of the present invention in place with a corner of the tarp pulled back to expose one of the latches used to secure the tarp.
Figure 4:
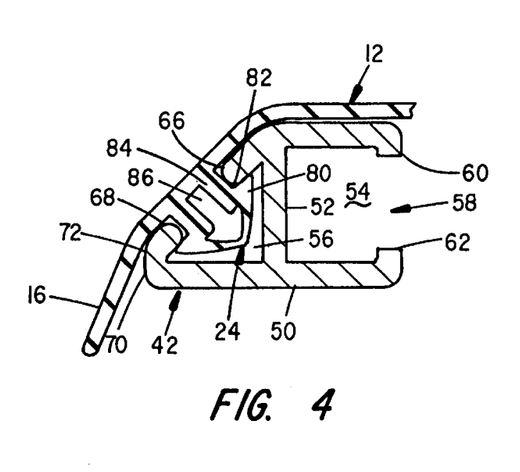
FIG. 4 is a cross-sectional view of one of the side rails showing one way in which the tarp can be releasably secured to the side rail.

FIGS. 1 and 2 show a cover 10 consisting of a flexible, durable, stretchable tarp 12 and a frame 40. The tarp 12 is preferably made of a water-resistant material or treated to make it water resistant. The tarp 12 has a front edge 14, a pair of side edges 16 and 18, and a back edge 20. Running along and adjacent to each of the side edges 16 and 18 are flexible, compressible beads 24. The flexible beads 24 are preferably tapered and about ⅜ of an inch wide at their widest point. The beads 24 are preferably made of an extruded plastic material created from polyvinyl chloride and a tri(2-ethylhexyl) trimellitate plasticizer. As shown in FIG. 4, a cross section of each bead 24 has an arrow-shape defined by a head 80 having a base 82 coupled to a shaft 84. The beads also preferably have a hollow core 86.

Figure 3:
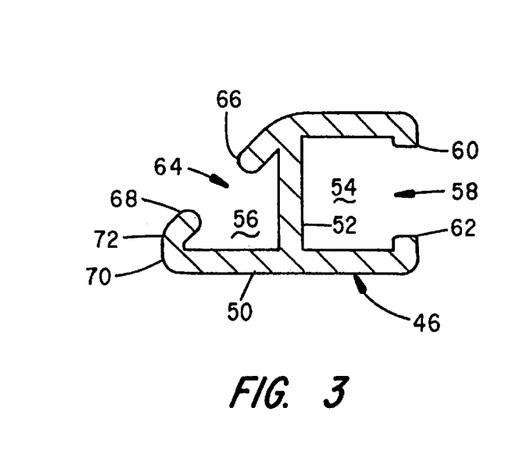
FIG. 3 is a cross-sectional view of one of the side rails of the frame.

The frame 40 includes a front rail 42, a pair of side rails 46, and a back rail 48. The front rail 42 is fixed to the top of the front wall of a vehicle box. The side rails 46 are fixed to the top of the opposing side walls of the vehicle box. As shown in FIG. 3, the rails 46 each include a bottom member 50, an upright center member 52 projecting upwardly and perpendicularly from the center of the bottom member 50, and a pair of channels 54 and 56 located above the bottom member 50 on opposite sides of the upright center member 52. Channel 54 has a generally C-shape and has an opening 58 facing toward the interior of the vehicle box. The opening 58 of channel 54 is defined by a pair of lips 60 and 62. Channel 56 has an opening 64. Opening 64 is defined by a pair of lips 66 and 68. Lip 66 projects downwardly from the top of the upright center member 52 at approximately a 45° angle. Lip 68 has a first leg 70 that projects upwardly from the outside edge of bottom member and a second leg 72 that projects upwardly and inwardly at approximately a 45° angle from the top of the first leg 70. The opening 64 is approximately 0.025 inches wide and runs the entire length of the rail.

Figure 5:
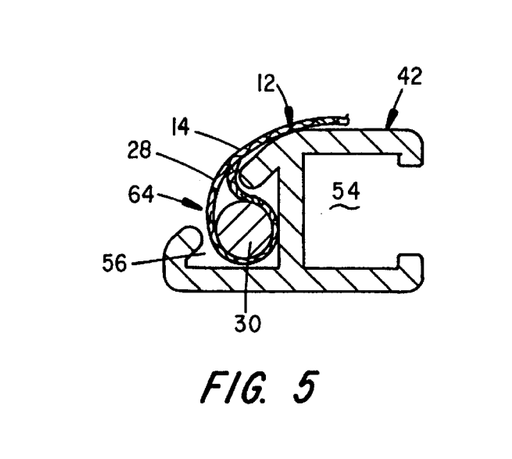
FIG. 5 is a cross-sectional view showing one embodiment for securing the tarp to either the front or back rail of the frame.
Figure 6:
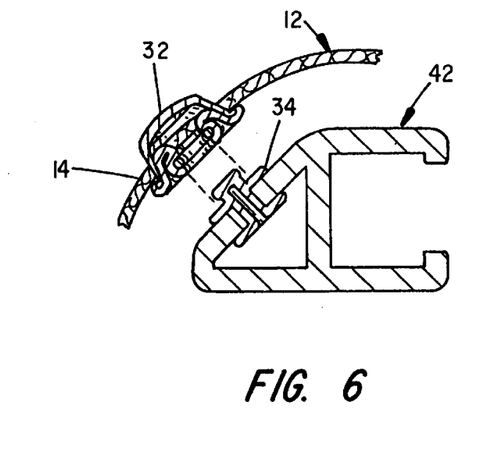
FIG. 6 is a cross-sectional view showing an alternative embodiment for securing the tarp to either the front or back rail of the frame.

For the apparatus to work properly, the front rail 42 should be firmly fixed to the top of the front wall of the vehicle box and to the front edge 14 of the tarp 12. Joining the tarp 12 and front rail 42 can be accomplished in any number of ways. For example, the front rail 42 can have the same general shape as the two side rails 46. As such, the front rail will also have a pair of channels 54 and 56. A bead, like bead 24, can be provided along the front edge 14 of the tarp 12. This bead can be inserted into channel 56 to fix the front edge 14 to the front rail 42 (see FIG. 4). Alternatively, and as shown in FIG. 5, a loop 28 can be provided along the front edge 14 of the tarp 12. The loop 28 can be inserted into the channel 56. A flexible rod or cord 30 having a diameter larger than the opening 64 can be inserted into the loop 28 through the open end of the front rail 42 to further secure the front edge 14 of tarp 12 and the front rail 42 together. The front edge 14 of the tarp 12 and the front rail 42 can also be joined together using a row of spaced snap closures. See FIG. 6. The snap closures can be spaced six inches apart, for example. Each snap closure includes a female snap member 32 fixed along the front edge 14 of the tarp 12 and a male snap member 34 fixed to the front rail 42 of the frame 40. The female snap members 32 and male snap members 34 are positioned and shaped to interlock to join the front rail 42 to the front edge 14 of the tarp 12. Each of these and other arrangements can be used to fix the front edge 14 of the tarp 12 to the front rail 42 which, as indicated above, is fixed to the top of the front of the truck box.

The back rail 48 of the frame 40 has two primary functions. The first is to serve as a spindle about which the tarp 12 can be rolled or unrolled. The second is to assist in stretching the tarp 12 and holding it over the truck box in a covered position. To perform these functions effectively, the back rail 48 should not be permanently fixed to the box of the truck. The back rail 48, however, should be fixed to the back edge 20 of the tarp 12. Any of the techniques described for joining the front edge 14 to the front rail 42 are suitable for joining the back edge 20 to the back rail 48. To reduce production costs, the back rail 48 will preferably have the same elements as the two side rails 44 and 46. As such, the back rail 48 will have a bottom member 50, and upright center wall member 52, and a pair of channels 54 and 56 located above the bottom member 50 and on opposite sides of the upright center member 52. Channel 54 will have an opening 58 defined by a pair of lips 60 and 62 and channel 56 will have an opening 64 defined by a pair of lips 66 and 68.

Figure 7:
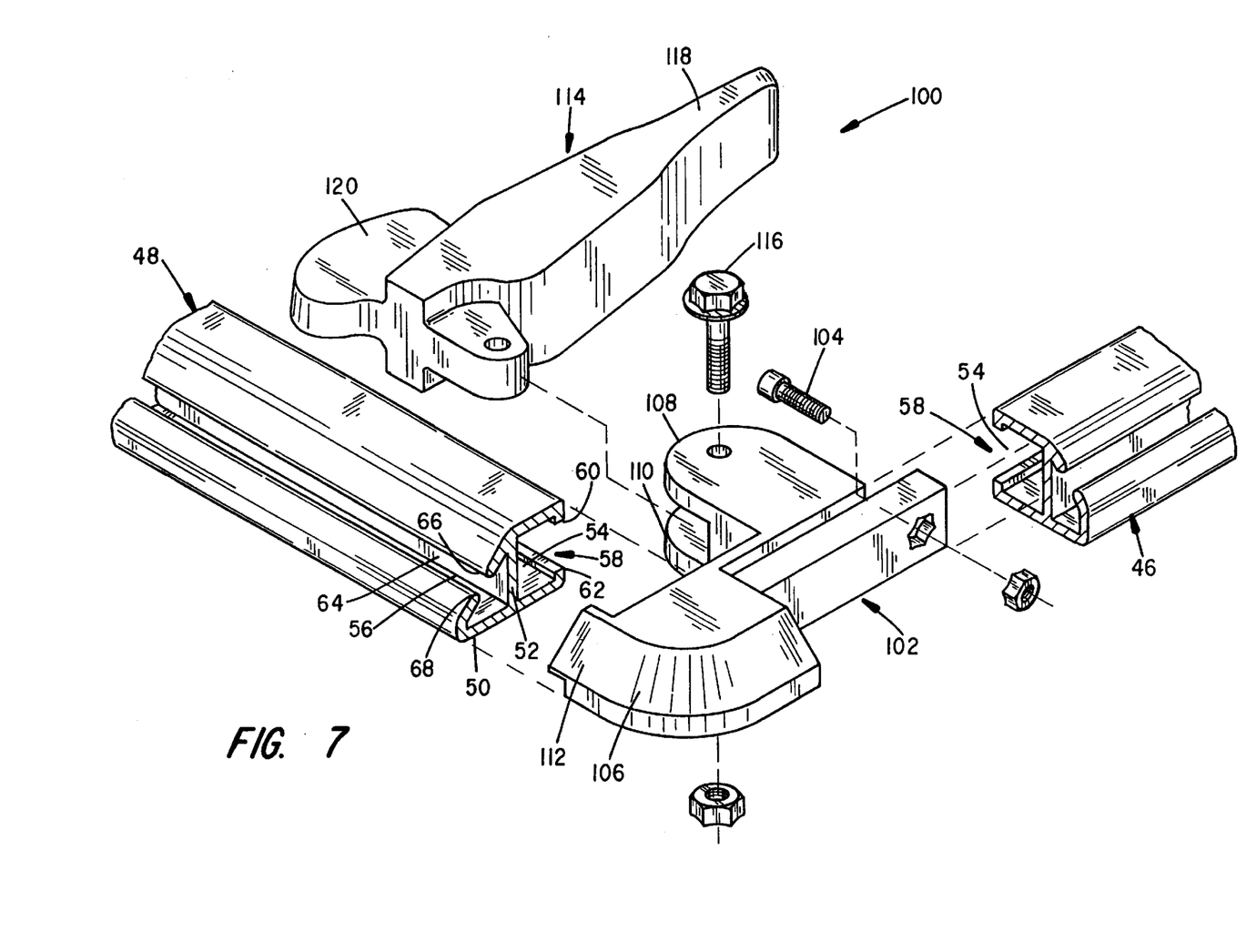
FIG. 7 is a perspective view showing the various components of the latch and how it cooperates with one of the side rails and the back rail.

An important feature of the present invention are the two cam latches generally designated 100 which are located at the back end of each side rail 46. Each cam latch has a mounting member 102. The mounting member 102 is sized so that it can be slid into the C-shaped channel 54 through the back open end of the side rail. The width of the mounting member is such that it cannot pass through the opening 58 of the C-shaped channel 54. The mounting member can be fixed in place in the channel using a set screw 104.

Integrally molded with the mounting member 102 are a stop member 106 and a pair of hinge elements 108 and 110. The stop member 106 covers the back end of both channels 54 and 56 of the rail. The stop member 106 also includes a ledge 112 that projects inwardly from the side rail toward the other side rail.

Figure 9:
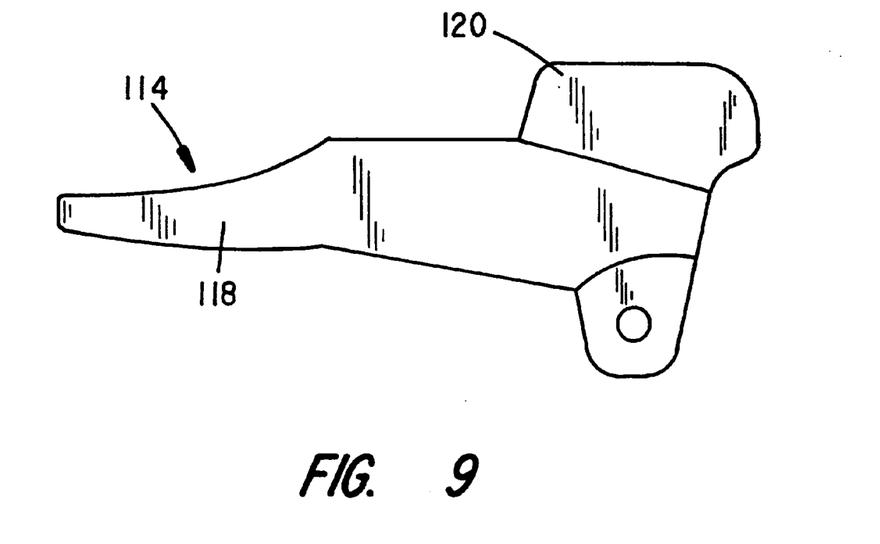
FIG. 9 is a top plan view of the lever of a latch.
Figure 10:
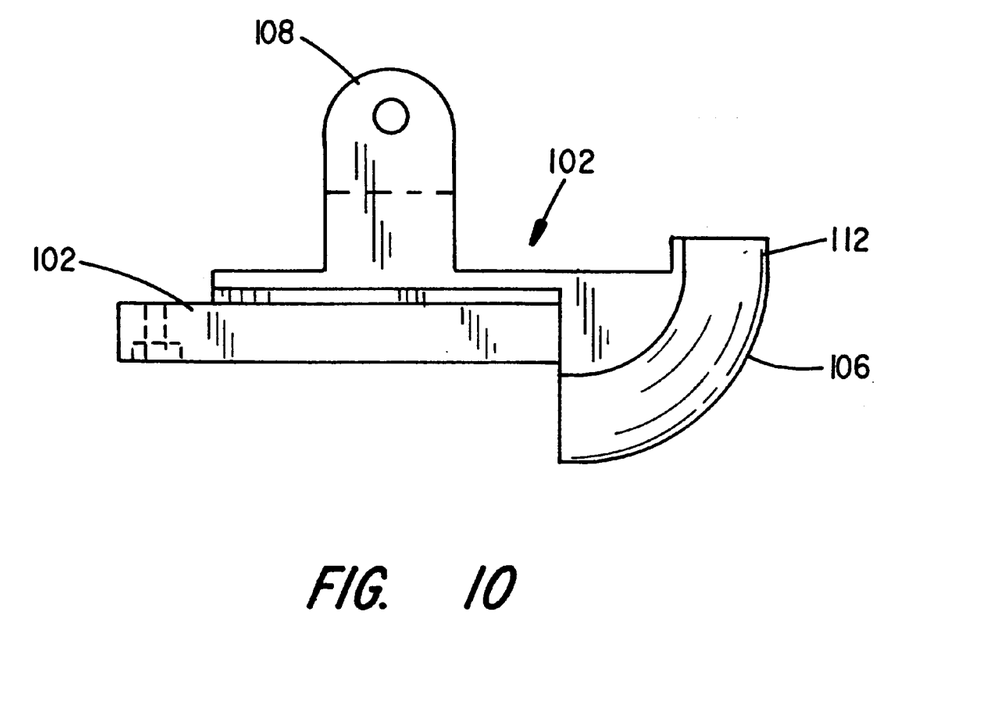
FIG. 10 is a top plan view of the mounting member of a latch.

Each cam latch also includes a lever 114. The lever 114 is attached to the hinge elements 108 and 110 by a pin 116 so that the lever can rotate about the pin 116. The lever 114 includes a handle 118 and an engagement member 120 at the end of the handle 118 nearest the hinge elements 108 and 110. The width of the engagement member is less than the width of the opening 58 to the C-shaped channel 54 of the back rail 48.

Now that the various components that make up the cover 10 have been described, its installation and operation will be explained.

The front rail 42 and the side rails 46 are fixed to the respective tops of the front and side edges of the box. An attachment is made between the front edge 14 of the tarp 12 and the front rail 42 using any of a variety of techniques such as those discussed above. An attachment is also made between the back rail 48 and the back edge 20 of the tarp 12. The mounting member 102 of the two cam latches 100 are each inserted through the open back end of the opposing side rails 46 and secured in place using a set screw 104. This installation is very simple. Once complete, it allows one to roll the tarp 12 up around the back rail 48 toward the front rail 42 and the front of the box or roll it out toward the back of the box.

Figure 8:
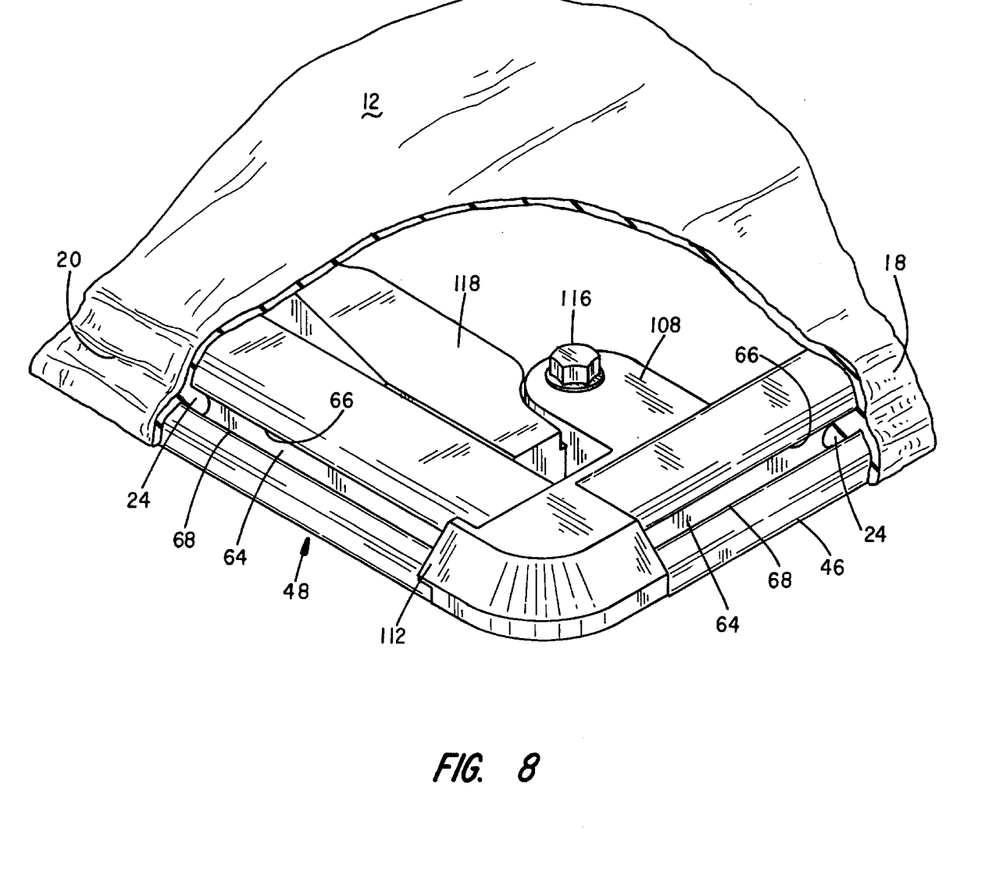
FIG. 8 is a perspective view with a portion of the tarp cut away to show how the latch cooperates with the back rail and a side rail to secure the tarp in place.

When one desires to cover the box, the tarp 12 is rolled out. The back rail 48 and the tarp 12 are long enough so that the ends of the back rail 48 can be placed between the ledge 112 and the engagement member 120 of each cam latch 100 with the opening 58 of the channel 54 of the back rail 48 facing the engagement members 120. The handles 118 of the two cam latches 100 are then rotated so that the engagement members 120 pivot toward the back rail 48, pass through the opening 58 into the channel 54 of the back rail 48 and engage the upright center member 52 of the back rail 48. Continued rotation of the handles force the back rail 48 back so as to tighten the cover and bring the back rail 48 into engagement with the ledges 112 of the stop members 106. Upon full rotation of the two cam latches 100 into the locked position (shown in FIG. 8), the ledges 112 and engagement members 120 cooperate to hold the tarp 12 in place. The sides of the tarp 12 are then fully secured in place by inserting the beads 24 along the side edges 16 and 18 of the tarp 12 through the openings 64 of the channels 56 of the side rails 46 to create a sufficiently tight seal along each side of the tarp 12. This tight seal is created by pushing the head 80 of each bead all the way through the opening 64 so that base 82 of the head 80 of beads 22 or 24 are captured by the lips 66 and 68 of the opening 64 in the side rails. See FIG. 4.

Opening the cover is also very straightforward. All one needs to do is rotate the handles 118 of the cam latches 100 in the opposite direction until the engagement members 120 are no longer positioned in the channel 54. This serves to relieve the tension on the cover permitting the back rail 48 to be pushed forward past the ledge 112 and then lifted up. One can then roll the cover up using the back rail 48 as a spindle. The forces applied when rolling are generally sufficient to pull the beads 22 and 24 from the channels 56 of the side rails 44 and 46.

What is claimed is:

1. An apparatus for covering the open top of a vehicle box of the type defined by a bed, an upright front wall, a pair of opposing upright side walls, and an open top, said apparatus having a first state in which the open top is at least partially covered and a second state in which the open top is uncovered, said apparatus comprising:
   (a) a frame including a front rail secured in position at the front of said box, first and second side rails each secured to one of said pair of opposing upright side walls of the box and each having a front end and a back end, and a back rail having a first end and a second end;
   (b) a stretchable tarp having a front edge, a back edge, a first side edge and a second side edge;
   (c) means for securing the front edge of said tarp to said front rail;
   (d) means for securing the back edge of said tarp to said back rail;
   (e) means for releasably securing said first side edge of said tarp to said first side rail;
   (f) means for releasably securing said second side edge of said tarp to said second side rail;
   (g) a first cam latch for releasably securing the first end of said back rail to the back end of said first side rail, and a second cam latch for releasably securing the second end of said back rail to the back end of said second side rail, each of said cam latches being secured to a side rail and having a stop member, each of said cam latches also having a lever rotatable in a first direction and in a second direction opposite the first direction, said lever including a handle and an engagement member which engages the back rail and, upon rotation of the lever in the said first direction, causes the tarp to stretch and the end of the back rail to engage said stop member and, upon rotation in the second direction, allows the tarp to be released from said stop member.

2. The apparatus of claim 1 wherein said means for releasably securing said first side edge of said tarp to said first side rail comprises a channel having an opening running from the front end to the back end of said first side rail and a flexible, compressible bead running along the first side edge of said tarp, said bead being sized to be insertable through the opening of said channel and cooperative therewith to releasably secure the first side edge to the first side rail; and wherein said means for securing said second side edge of said tarp to said second side rail comprises a channel having an opening running from the front end to the back end of said second side rail and a flexible, compressible bead running along the second side edge of said tarp, said bead being sized to be insertable through the opening of said channel and cooperative therewith to releasably secure the second side edge to the second side rail.

3. An apparatus for covering the open top of a vehicle box of the type defined by a front, a back, a first side wall, a second side wall and an open top, said apparatus having a first state in which the open top is covered and a second state in which the open top is uncovered, said apparatus comprising a tarp having (a) a front edge secured to a front rail, said front rail secured in position at the front of the box; (b) a back edge secured to a back rail, said back rail releasably securable at the back of the box by a pair of cam latches, each of said cam latches being secured to a side rail and having a stop member, each of said cam latches also having a lever rotatable in a first direction and in a second direction opposite the first direction, said lever including a handle and an engagement member which engages the back rail and, upon rotation of the lever in said first direction, causes the tarp to stretch and the end of the back rail to engage said stop member and, upon rotation in the second direction, allows the tarp to be released from said stop member; (c) a first side edge having a first flexibly compressible bead along its length and extending therefrom, said bead being sized and shaped to be insertable into and cooperate with an opening of a channel in a first side rail, said first side rail fixed to said first side of said box; and (d) a second side edge having a second flexible, compressible bead along its length and extending therefrom, said bead being sized and shaped to be insertable into and cooperate with an opening of a channel in a second side rail, said second side rail fixed to said second side of said box.

4. The apparatus of claim 3 wherein said openings of said channels in said first and second rails are each defined by a first lip and a second lip.

5. The apparatus of claim 3 wherein said first and second flexible, compressible beads have a head and a shaft.

6. The apparatus of claim 3 wherein said first and second beads have a shaft and a head with a base and the openings of channels of said first and second side rails are each defined by a first lip and a second lip such that the head of the bead can be inserted past the first and second lips which cooperate with the base of the head to releasably secure the head of the bead within the channel.

7. The apparatus of claim 3 wherein said first and second beads have a hollow core.

8. The apparatus of claim 3 wherein said first and second beads are made of an extruded material.

9. The apparatus of claim 8 wherein said material is a plastic created from a polyvinyl chloride and a tri (2-ethylhexyl) trimellitate plasticizer.

10. An apparatus for selectively covering said open top of a vehicle box of the type defined by a front, a back, a first side wall and a second side wall, and an open top, said apparatus including:
   (a) a first side rail fixed to the first side wall of the box, said first side rail having a front end and a back end;
   (b) a second side rail fixed to the second side wall of the box, said second side rail having a front end and a back end;
   (c) a front rail fixed in place at the front of the box;
   (d) a back rail having a first end and a second end;
   (e) a first cam latch fixed to the back end of the first side rail for engaging and releasably securing the first end of the back rail;
   (f) a second cam latch fixed to the back end of the second side rail for engaging and releasably securing the second end of the back rail; and (g) a tarp having a front edge, a back edge, a first side edge and a second side edge, said front rail being securable to said tarp along its front edge, said back rail being securable to said tarp along its back edge, said first side rail being securable to the tarp along its first side edge, and said second side rail being securable to said tarp along its second side edge.

11. The apparatus of claim 10 wherein said first side rail is securable to said tarp along its first side edge through cooperation between a channel in the first side rail and a first bead on the tarp.

12. The apparatus of claim 11 wherein said second side rail is securable to said tarp along its second side edge through cooperation between a channel in the second side rail and a second bead on the tarp.

13. The apparatus of claim 12 wherein said first and second beads are comprised of an extruded material which is flexible and compressible.

14. The apparatus of claim 13 wherein said beads, in cross-section, have an arrow-shape defined by a head joined to a shaft.

15. The apparatus of claim 10 wherein first and second cam latches each include a mounting member, a stop member, and a lever pivotally mounted to the mounting member, said lever including a handle and an engagement member for engaging an end of the back rail and forcing said end of the back rail into contact with the stop member to selectively secure the back rail and tarp so that the open top of the box is covered.

16. The apparatus of claim 15 wherein said back rail includes a channel having at least one wall member and an opening through which the engagement member passes before engaging said wall member of the back rail to force said back rail into contact with said stop member.

* * * * *